United States Patent

[11] 3,634,646

| [72] | Inventor | Michel Camille Berger<br>St. Lambert-des-Bois, France |
|---|---|---|
| [21] | Appl. No. | 43,010 |
| [22] | Filed | June 3, 1970 |
| [45] | Patented | Jan. 11, 1972 |
| [73] | Assignee | Velcro SA<br>Chalet Planoiras, Lenzerheide, Switzerland |
| [32] | Priority | June 3, 1969 |
| [33] | | Switzerland |
| [31] | | 8464/69 |

[54] METHOD OF AND APPARATUS FOR CUTTING LOOPS PLACED ON A SUPPORT FOR PRODUCING HOOKS THEREFROM
13 Claims, 15 Drawing Figs.

[52] U.S. Cl.................................................. 219/121 L,
219/121 EB
[51] Int. Cl.................................................... B23k 9/00
[50] Field of Search........................................ 219/121 L,
121 EB

[56] References Cited
UNITED STATES PATENTS

| 3,369,101 | 2/1968 | DiCurcio...................... | 219/121 |
| 3,417,222 | 12/1968 | Cannon et al................. | 219/121 |
| 3,112,850 | 12/1963 | Garilotti...................... | 225/2 |

*Primary Examiner*—R. F. Staubly
*Assistant Examiner*—George A. Montanye
*Attorney*—Werner W. Kleeman

ABSTRACT: The method of cutting loops fixed to a tape for the production of hooks is used in the manufacture of flexible separable fastener elements of the type formed by two parts provided respectively with interengageable loops and hooks. A tape having loops arranged in equally spaced transverse rows on the tape is caused to advance in longitudinal direction. The passage of each row of loops at a predetermined point is located by means of a luminous beam, and a high power laser beam is directed on each loop of the row when this latter passes said predetermined point to effect a cutting action on the loop.

PATENTED JAN 11 1972 3,634,646

METHOD OF AND APPARATUS FOR CUTTING LOOPS PLACED ON A SUPPORT FOR PRODUCING HOOKS THEREFROM

This invention relates to a method for cutting loops placed on a support for producing hooks therefrom and to apparatus for carrying out this method.

The method of this invention is destined to be applied in the manufacture of flexible fastener elements formed by two parts provided respectively with loops and with hooks, of the type which are described for example in Swiss Pat. Nos. 296,638 and 339,155. The hooks of such fastener elements generally are formed by loop-shaped threads of plastic material, the loops being cut so as to form hooks. Cutting of these loops is effected by means of mechanical-cutting devices. A device for effecting such cutting is described in Swiss Pat. No. 333,879. Such a device comprises two comblike cutters one of which is mobile and arranged to reciprocate with respect to the other one which is stationary, in order to obtain a shearing action between the two cutters. The loops of the fastener elements are engaged between the comb teeth of the fixed cutter and are cut by the to-and-fro movement of the movable cutter. These conventional mechanical-cutting devices are delicate, require an expensive maintenance and must frequently be adjusted. On the other hand, when they effect cutting of a loop for making a hook therefrom, the cutoff portion is not removed and remains on the support, so that when the hooks on the support are placed into the position of interengagement with the loops, the cut portion first must be pushed away laterally in order that the hook may enter into a loop.

The present invention relates to a method for cutting loops placed on a support for producing hooks therefrom, the loops to be cut having two leg portions and being regularly disposed on the support in successively arranged and equally spaced rows. It is an object of the invention to provide a method for cutting the loops of fastener elements, in which the cutting operation is effected at high speed and requires a single initial adjustment to produce perfectly shaped hooks without cut off pieces remaining on the support as it is the case with conventional mechanical cutting devices.

According to the invention, this method comprises the steps of advancing said support with the loops thereon, locating the passage of each of said spaced rows of loops at a predetermined point, and directing a high power laser beam against one of said leg portions of each loop in a row of loops when said row passes said predetermined point.

Since the cutting operation of the loops is effected by a high power laser beam it is obvious that the method according to the invention is not limited to cutting loops of plastics material, but the method can also be used for cutting metal loops fixed for example on a support of metal or of plastics.

The accompanying drawings represent by way of example several embodiments of apparatus for carrying out the method according to the invention.

The apparatus represented in the drawings is destined to effect cutting of one of the leg portions of each loop mounted on a tape for producing hooks. It is obvious that this apparatus can be used only for cutting the loops arranged on a tape in uniform manner in aligned rows. The tape 1 which is processed in the apparatus of FIGS. 1 to 4 comprises woven loops disposed in a direction parallel to the axis of the tape, the loops being aligned in transverse rows placed successively at the same distance one from the other and at right angles to the axis of the tape. The tape 1 is supplied from a roller, not shown, passes under a roller 2 (FIG. 2) and over a drum 3, to pass under a roller 4 to be wound up on a receiving roller, not shown. The drum 3 forms part of a device which comprises a detector unit 5 emitting a very fine luminous synchronizing ray destined to locate the place of a row of loops and of a cutting laser 6 energized by the detector unit 5.

The detector unit 5 comprises a very high voltage source 7 feeding a monochromatic laser 8 which furnishes a concentrated luminous beam 9. Owing to the concentration of the beam 9 a power of some $m$ watts will be sufficient to energize a photoelectric cell 10 hit by the beam 9. The laser 8 which will be used in the apparatus is an argon laser, the radiation of which is visible and permit an easy adjustment of the device. However, it is not necessary, to use a laser in the detector unit. A conventional luminous source concentrated in such manner as to furnish a parallel beam as fine as possible also gives satisfactory results.

Figure 1:
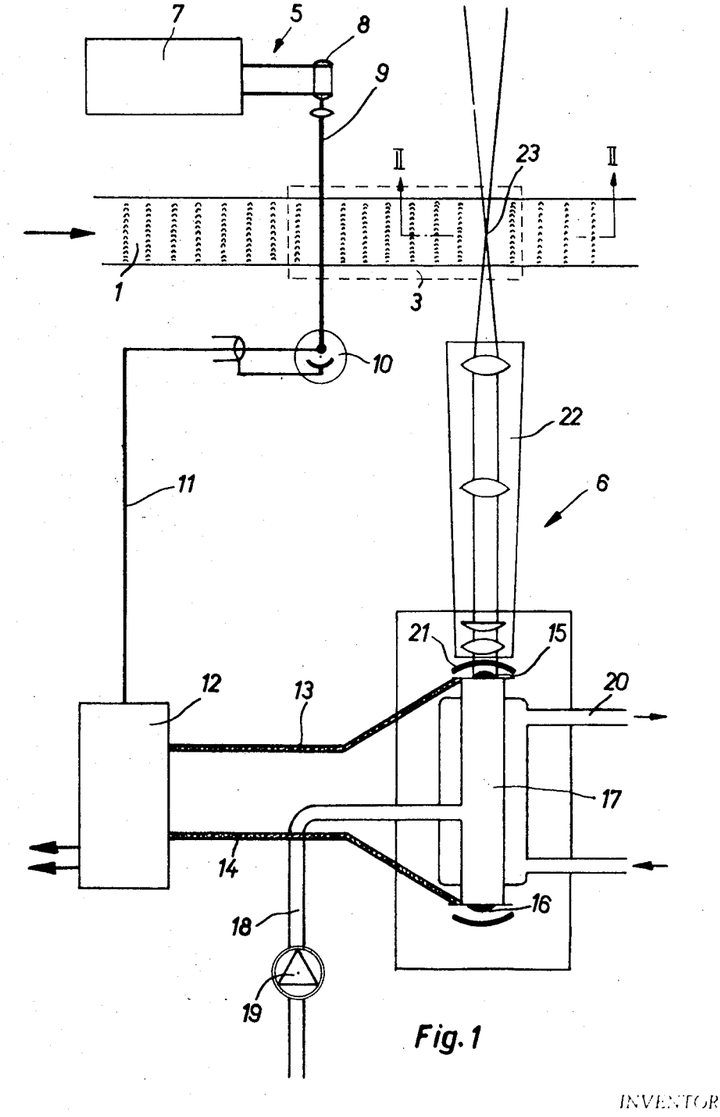
FIG. 1 is a diagrammatic representation of a first embodiment of apparatus for effecting the cutting of loops provided on a tape by means of a laser beam, the said loops being woven parallel to the axis of the tape and arranged in rows which are perfectly aligned in planes parallel to the beam which effects the cutting.
Figure 2:
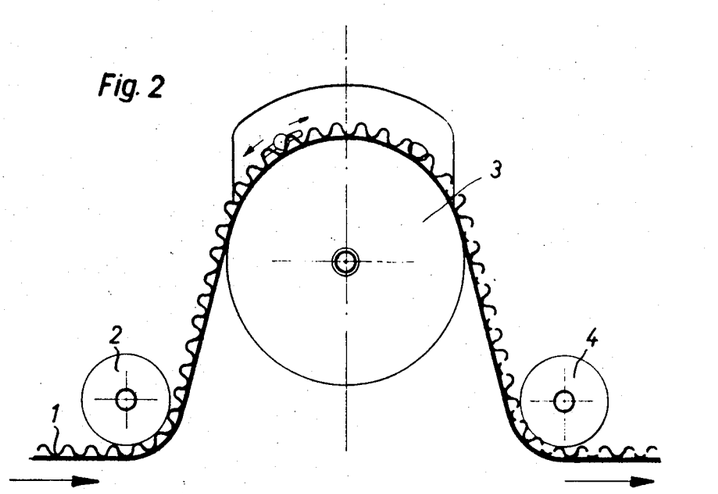
FIG. 2 is a longitudinal section along the line II—II of FIG. 1 across a tape-supporting drum at the place where cutting is effected, and drawn to a larger scale.
Figure 3:
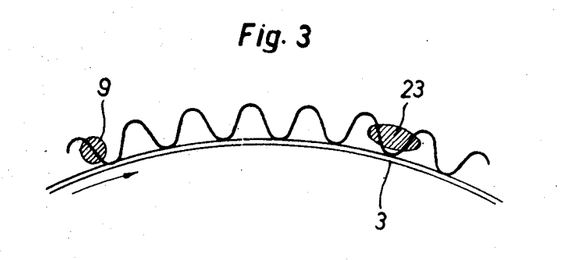
FIG. 3 is a detail view of the tape stretched on the drum at the moment of cutting.

The luminous concentrated ray 9 which is interrupted upon passage of a row of loops causes a variation of the voltage at the terminals of the photoelectric cell 10 which controls, by the intermediary of the synchronizer 11, a very high voltage pulse generator 12. The output terminals of the pulse generator 12 are connected by means of two cables 13 and 14 to the electrodes 15 and 16, respectively, of a $CO_2$ laser discharge tube 17 supplied by a feeding tube 18, the supply of the $CO_2$ laser being adjusted by a regulating device 19. A cooling unit 20 surrounds the discharge tube 17. For reasons of efficiency a monochromatic $CO_2$ laser has been chosen, since this laser emits a very fine ray and permits to adjoin an optical concentration device without prism effect dispersing the ray. On the other hand the $CO_2$ laser emit a band on a wavelength of $10\mu$, that is there where the thermal energy is the highest. The rated constant power of the laser tube 17 is 50 watts or 3 kw. at the pulse peaks of 100 c.p.s. recurrence frequency. The laser tube 17 is provided with a resonance mirror 21 and with an optical unit 22 formed by a plurality of lenses which concentrate the laser beam at 23 to the shape of an elliptical beam on the loops to be cut of the tape passing below the cylinder 2, over the drum 3 and below the cylinder 4 (FIG. 2).

The tensioning cylinders 2 and 4, the drum 3 as well as the supply and receiving rollers, not shown, form the transporting unit of the apparatus, destined to advance and to tension a tape to be processed, this unit being driven by a motor, not shown, which is controlled by the detection unit 5. The drum 3 is adjustable in horizontal and vertical direction, permitting to place the loops at the desired place with respect to the luminous synchronization ray 9 and to the beam of the laser effecting the cutting at 23. The drum 3 also is exchangeable and with drums of different diameters it is possible to choose the most favorable cutting angle as a function of the dimension of the loops, of the space between two successive rows of loops, and of the flexibility of the tape.

The apparatus described above operates as follows: The tape 1, the loops of which are desired to be transformed into hooks, is carried along by the drum 3. When the leading or front legs of the loops of one row, with respect to the direction of movement of the tape, intercept with the concentrated beam 9 supplied by the laser 8, a drop of voltage occurs at the terminals of the photoelectric cell 10 which energizes the synchronization device of the high tension generator 12. A high-voltage pulse arrives at the terminals 15 and 16 of the laser tube 17 which emits at 21 a concentrated infrared beam. It suffices accordingly to adjust the laser 8 which emits the detection ray 9 so that the infrared ray emitted by the tube 17 and arriving at 23 passes exactly between two successive rows of loops, (see FIG. 3) and cuts the front legs of the loops of the row situated at the left side of the said ray, as well as the rear legs of the loops of the row situated at the right of the said ray.

Figure 4:
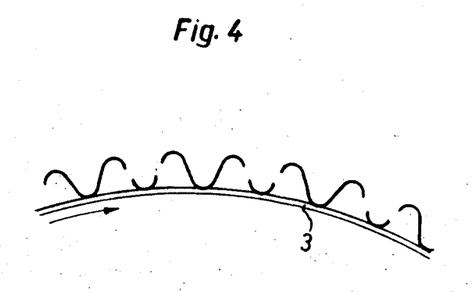
FIG. 4 is a detail view of the stretched tape on the drum after having effected a cutting operation.

It is obvious that in order to obtain the hooks represented in FIG. 4, it is necessary that the laser tube 17 is only energized at the passage of the front legs, with respect to the direction of advance of the tape, of each second successive row of loops. It is also possible to adjust the laser 8 of the detection unit 5 in such manner that the concentrated ray 9 will be interrupted by the peaks of a row of loops, as represented in FIG. 2. As in the preceding case the cutting laser 17 must be energized only at the passage of the peaks of the loops of each second row.

It is still possible to reduce the sectional area of the cutting laser 17 so that it cuts only the front legs or the rear legs of the loops of a single row at one time, and to adjust the laser 8 of the detecting unit 5 so that it energizes the cutting laser either upon the passage of the peaks, or upon the passage of the front or the back legs of the loops of each row.

With a monochromatic laser of 50 watts emitting in the infrared band, such as that described above, a tape of a width of 60 millimeters travelling at a speed of 15 cm. per second, was treated, which would correspond to a laser frequency of 60 pulses per second. This travelling speed corresponded to the speed of a weaving loom weaving the tape, and the cutting apparatus or laser had been placed following the weaving loom.

Figure 5:
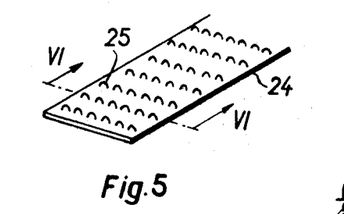
FIG. 5 represents a different type of tape than that of FIGS. 1 to 4, the loops being disposed at right angles to the longitudinal axis of the tape and being placed in rows extending at right angles to said axis.
Figure 6:
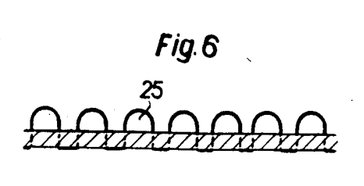
FIG. 6 is a section through the tape according to the line VI—VI of FIG. 5.

The tape 24 represented in FIGS. 5 and 6 is provided with loops 25 disposed at right angles to the axis of the tape and arranged in equally spaced rows, the rows being also situated at right angles to the axis of the tape 24. It is obvious that the tape 24 cannot be processed with the same means as that used for processing the tapes having the loops arranged parallel to the travelling direction of the tape. Accordingly, a modified apparatus has been provided which is described with reference to FIGS. 7 to 9 for processing the tapes represented in FIGS. 5 and 6.

Figure 8:
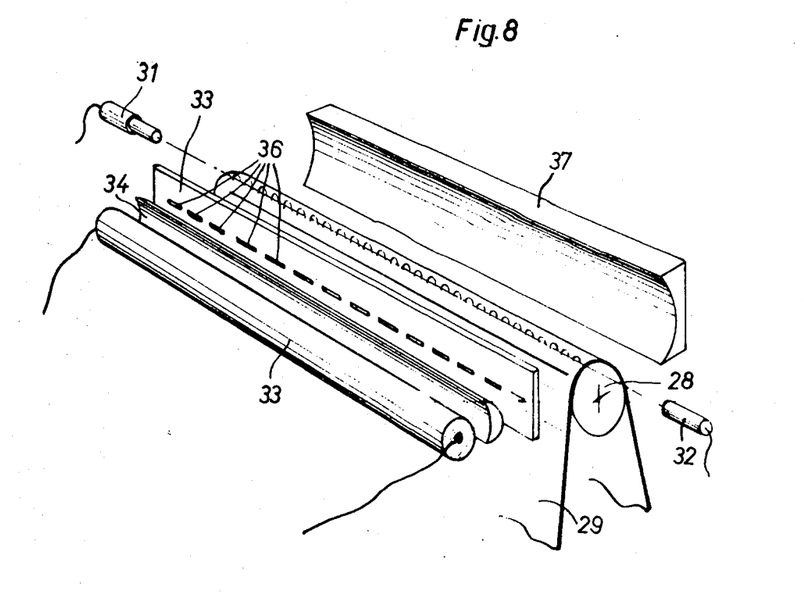
FIG. 8 is a perspective view of the apparatus illustrated in FIG. 7.
Figure 10:
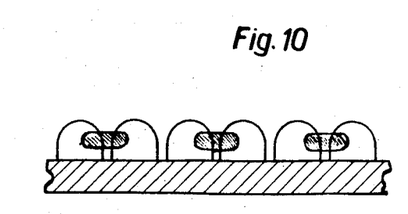
FIG. 10 is a sectional view of a tape portion stretched on a drum of the apparatus according to FIG. 7 at the moment of cutting.
Figure 11:
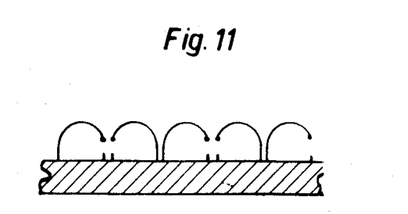
FIG. 11 is a view similar to that of FIG. 10 after having effected the cutting operation.

This modification comprises rollers 26 and 27 and a drum placed intermediate and at a higher level than the said rollers. A tape 29 of the type represented in FIGS. 5 and 6 is tensioned between the drum 28 and the rollers 26 and 27 and is driven by not represented driving means. The drum 28 has a relatively small diameter, approximately equal to three times the distance between two successive rows of loops on the tape, in order that the tape travelling in the direction of the arrow 30 exposes each row of loops, one after the other, without the preceding or the successive row projects into the working space required for the transformation of the loops of the said row into hooks. At the precise moment when one row of loops is at the peak of the drum 28, it interrupts the ray emitted by a low power laser 31 and directed against the photoelectric cell 32. The laser 31 and the cell 32 together form the detector unit of the apparatus, this unit being represented in detail in FIG. 9. When the beam emitted by the laser 31 is interrupted by a row of loops of the tape 29, the cell 32 energizes a pulse emitting laser 33 destined to effect the cutting of the loops of the row in order to produce the hooks. The laser beam emitted by the power laser 33 is concentrated by a cesium lens or appropriate optical unit 34 which directs this laser beam on a mask 35 which is perforated by elongate slits 36 as represented in FIG. 8. The dimensions of the slits 36 of the mask 35 must correspond with the dimensions and the spacing of the loops to be processed, so that the beams traversing the slits and impinging on the loops have a shape viewed in section as represented at 38 in FIG. 10. In the case where several different types of tapes have to be processed by the same apparatus, a set of masks corresponding to the number of loops, to the dimensions and to the spacings of the loops on the tape will be provided for processing of each type of tape. During the short pulse furnished by the laser 33, the beams traversing the slits 36 and impinging on the loops cut said loops and form hooks thereof as represented in FIG. 11. After having traversed the loops, the laser beams impinge against an electrically charged anode 37 destined to improve the parallelism of the beams and to interrupt them in order that these latter do not contact persons or objects placed in proximity to the apparatus.

During tests which had been effected with a pulse emitting laser of 10 kw. peak power, the loops of one range had been cut and transformed into hooks within 1/100 of 1 second.

Figure 7:
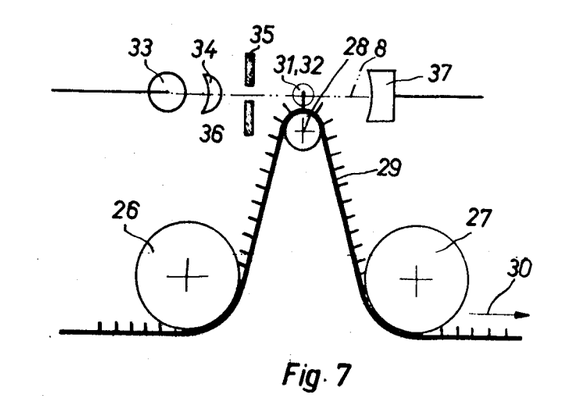
FIG. 7 is a sectional view of a modified apparatus destined to cut the loops of the tapes represented in FIG. 5 and 6.

The apparatus described with respect to FIGS. 6 to 8 can be modified for processing tapes having loops disposed in rows according to any desired angle relatively to the axis of the tape. It suffices in this case to provide adjusting devices permitting to effect a pivoting movement of the detector unit 31 and of the cutting laser 34 through an angle corresponding to the position of the rows relatively to the travelling direction of the tape and to guide this tape on the drum 28 so that the rows are parallel with the generatrix of the drum.

On the other hand the apparatus just described can still be used to process tapes similar to that represented in FIGS. 5 and 6, but in which the loops of each second row would be displaced through the width of one half loop with respect to the loops of the preceding row. In this case it is possible to use masks provided with larger slits adapted to be traversed by a laser beam which can not only cut two legs of one loop but also the two legs of a displaced loop of the next following row.

In a modification which is not represented, the high power laser 33 can be formed by a resonance tube which is bent over in its middle and comprises two resonance mirrors and an optical concentrator 37 oscillating according to a certain angle, the sweeping range of which is proportional to this angle and covers the totality of the mask 35.

The beam thus passes through the openings 36 of the mask and the obtained processing, in contradistinction to that obtained by the above-described apparatus, has a much greater caloric density because it is more concentrated, but it must sweep for a very short moment the totality of the row of loops to be processed.

This modification can be used to process tapes of small width which require a higher temperature owing to the material being thicker, or because the structure requires a higher caloric input (for example a metallic fabric).

Figure 12:
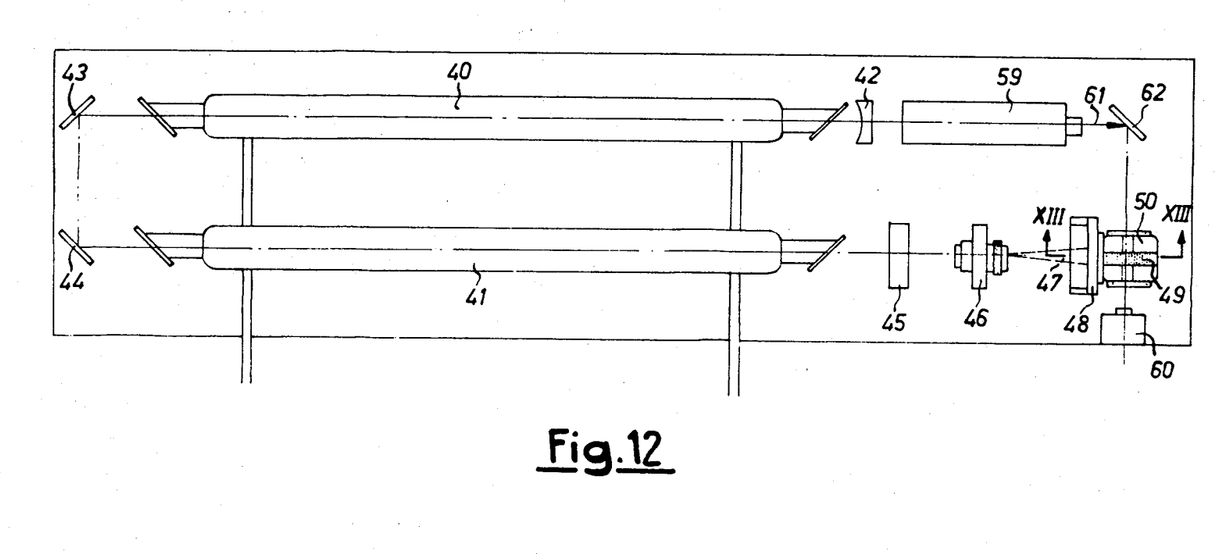
FIG. 12 is a plan view of a further modified apparatus for cutting loops.
Figures 13, 14:
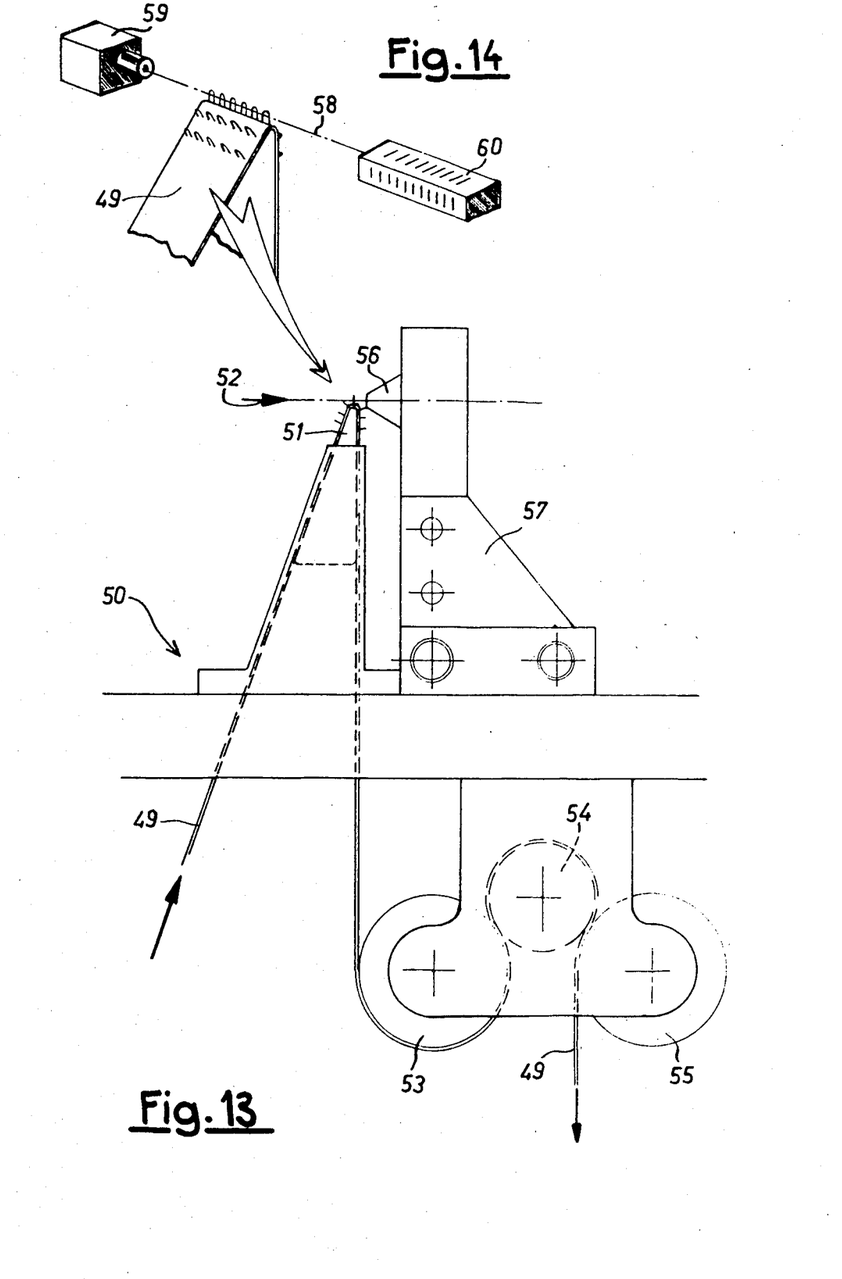
FIG. 13 is a sectional view of the driving device of the tape along the line XIII—XIII of FIG. 12, comprising a wedge destined to locate the loops for effecting the cutting operation.
FIG. 14 is a perspective view of the tape supported by the wedge of FIG. 13 and of a locating device for the rows of the loops, this device comprising a laser of small power and a photoelectric cell.

In the embodiment represented in FIGS. 12 to 15, the cutting laser is formed by two discharge tubes 40 and 41 disposed side by side and in coincidence arrangement. A total reflexion mirror 42 is placed at one end of the tube 40 and is adapted to reflect the laser beam into the tube 40 and into the tube 41 by the intermediary of two mirrors 43 and 44 placed at 90° one with respect to the other and at 45° with respect to the laser beam. At the outlet of the tube 41 the laser beam traverses a lens 45 destined to concentrate the beam, and then an anamorphotic 46 comprising a cesium lens as is represented at 47, the anamorphotic 46 causing the laser beam to diverge before impinging on a mask 48 similar to that of the apparatus described with respect to FIGS. 7 to 9. The mask 48 is provided with a series of elongate slits the dimensions of which correspond to the dimensions and to the spacing of the loops of the tape 49 to be processed. This tape 49 is of the same type as that represented in FIGS. 5 and 6 i.e., it is provided with rows of loops disposed at right angles to the longitudinal axis of the tape, the rows of loops being equally spaced one from the other. The tape 49 is driven by a device 50 represented in detail in FIG. 13. In this device 50 the tape 49 supplied from a roller, not shown, passes over a wedge 51 at the peak of which the rows of loops are successively cut by the laser beams 52 emerging from the mask; the tape then passes over three driving rollers 53, 54 and 55 and is wound up on a receiving roller, not shown. The device 50 still comprises a screen 56 arranged to intercept the laser beam 52, this screen being fixed to a support 57. A perspective view of the tape 49 on the wedge 51 is represented in FIG. 14. In the same manner as in the preceding embodiment, when the loops of one row arrive at the peak of the wedge 51, they intercept a luminous ray 58 of a detector unit comprising a low power laser 59 and a photoelectric cell 60. As represented in FIG. 12, the low power laser beam 61 emitted by the laser 59 is reflected towards the cell 60 by means of a mirror 62. When this beam 59 is interrupted by a row of loops as represented in FIG. 14 it controls by means of an electronic circuit to be described later the power laser, and the loops will be cut and transformed into hooks.

The laser tubes 40 and 41 operating in coincidence are carbonic acid gas tubes, neon or helium tubes and the laser tube 59 of the detector device is a neon laser.

Figure 9:
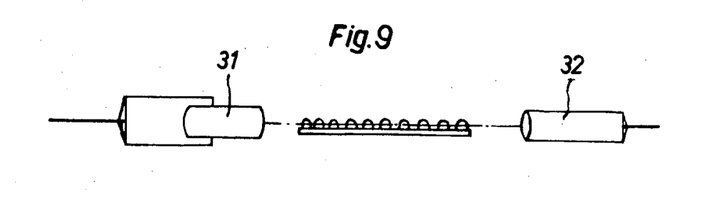
FIG. 9 represents a detail view of a locating device for the loop rows of the tape according to the modification shown in FIG. 7.

The operation of the apparatus described in FIGS. 12 to 14 is similar to that of the apparatus described with respect to FIGS. 7 to 9. The feeding and control circuits of the apparatus described are diagrammatically represented in FIG. 15. The high power laser tubes 40 and 41 are supplied from a preionization feeding unit 63 formed by a voltage regulator 64 connected to the net which is represented by the terminals 65 and 66, the voltage furnished by the regulator 64 being adjusted in a first transformer 67 and transformed into a very high voltage by a second transformer 68 before being rectified and filtered in a rectifier 69. The very high positive tension attained at the output of the rectifier 69 is applied to the terminals 70, 71 and 72, 73, respectively, of the laser tubes 40 and 41, respectively, by the intermediary of resistors 74, 75 and 76, 77, respectively.

Figure 15:
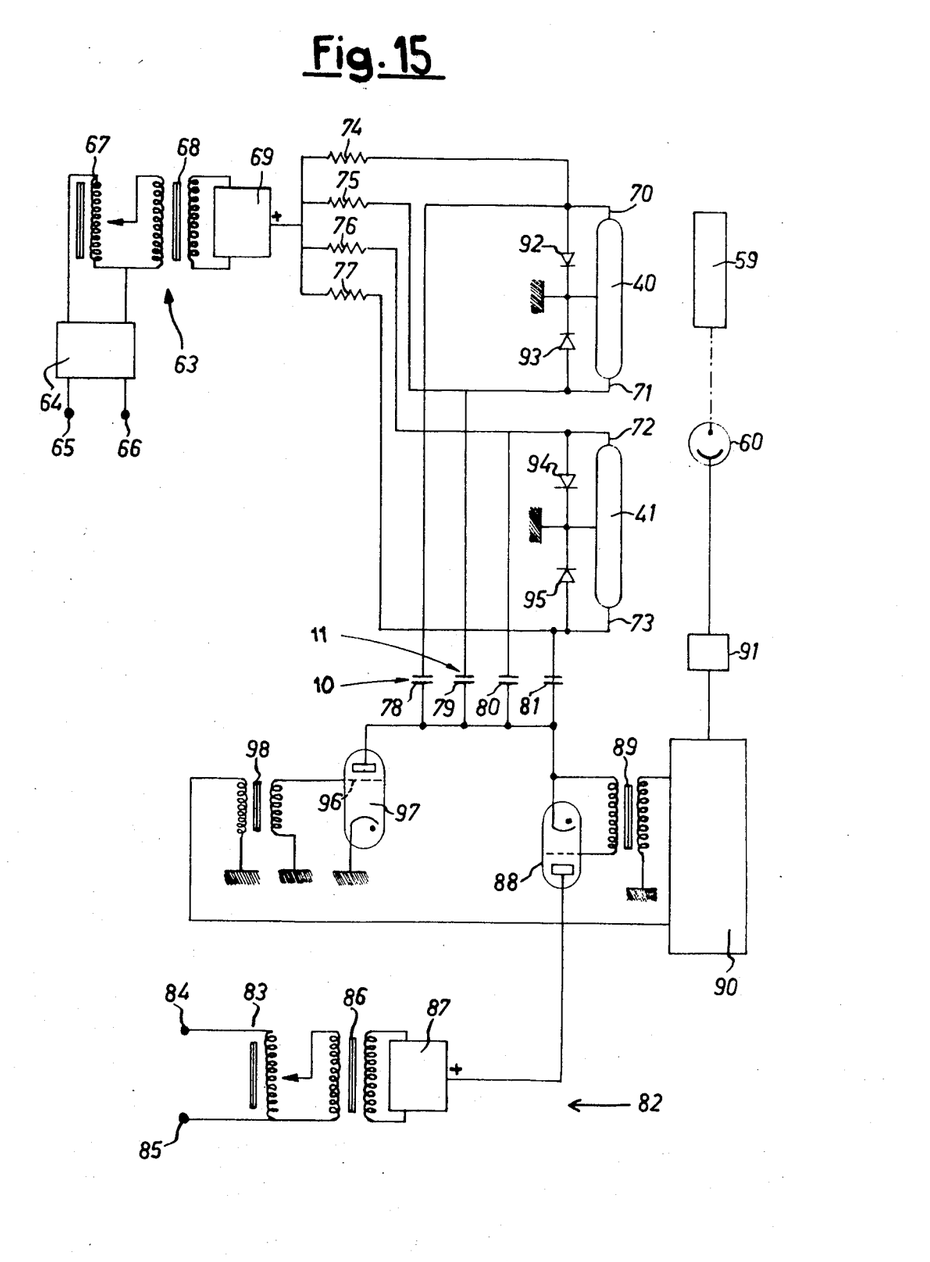
FIG. 15 is a diagram of the electric control circuit of the apparatus.

Capacitors 78, 79, 80 and 81 are connected each to a terminal 70, 71, 72 and 73 of the laser tubes 40 and 41, the capacitors being supplied by a charging circuit 82. This charging circuit comprises a regulating transformer 83 connected to the net represented by the terminals 84 and 85, a very high voltage transformer 86, a rectifier 87 including a filter in its output circuit, and a thyratron 88. A thyratron 88 is controlled by means of the transformer 89 by a pulse generator 90 which in turn is connected to the cell 60 by the intermediary of an inversing relay 91. As it has been explained above, when the loops of one row of the tape intercept the low power laser emitted by the laser tube 59, the voltage at the terminals of the cell 60 will drop and the inversing relay 91 energizes the generator 90 which renders the thyratron 88 conductive and the capacitors 78 to 81 will be charged. In order that charging of the capacitors 78 to 81 may be effected, the diodes 92, 93, 94 and 95 have been connected between each capacitor and the central terminal of each laser tube 40 and 41, this terminal being grounded. The generator 90 is arranged so as to produce, on the one hand, the pulse igniting the thyratron 88 to control the charging of the capacitors 78 to 81, when it is energized by the inversing relay 91, i.e., when a row of loops interrupts the laser beam impinging on the cell 60 and, on the other hand, to produce a second pulse having a predetermined time delay with respect to the pulse producing the charging of the capacitors 78 to 81, the time interval between these two pulses corresponding to the charging period of the capacitors. This second pulse arrives at the control electrode 96 of a second thyratron 97 by the intermediary of a transformer 98.

This second thyratron is destined to produce the discharge of the capacitors 78 to 81, which discharge causes energization of the high power laser tubes 40 and 41. Since the two pulses are separated by a constant and predetermined time interval, it will suffice to position the low power laser 59 and the cell 60 in such manner that the detector beam will be intercepted by the row of loops prior to the loops arriving quite on the top of the wedge 51 (FIG. 14), i.e., at the place where they are to be cut by the high power laser, so that the period of time required by the loops to arrive at the peak of the wedge 51 corresponds to the time delay between the two pulses furnished by the generator 90. If this condition is fulfilled, the power lasers 40 and 41 are energized each time when a row of loops arrives at the peak of the wedge 51.

It will be understood that the three described forms of embodiments have been described and illustrated by way of example only and the invention is not limited to the precise method and form of apparatus shown, but that various modifications can be effected without departing from the scope of the invention which is defined in the appended claims.

I claim:

1. Apparatus for cutting loops placed on a support for producing hooks therefrom, the loops to be cut having two having two leg portions and being regularly disposed on the support in successively arranged and equally spaced rows, which apparatus comprises a carrier surface bearing said support with said loops fixed thereto, driving means for tensioning and advancing said support on said carrier on said carrier surface, a detector unit arranged to locate the passage of each of said rows of loops at a predetermined point, a power laser adapted to be energized by said detector unit to emit a laser beam for cutting said loops of one row when said row passes said predetermined point.

2. Apparatus according to claim 1, in which said detector unit comprises an emitter for emitting a concentrated luminous beam, and a photoelectric cell for the control of the power laser emission.

3. Apparatus according to claim 2, in which said emitter of the detector unit is a low power laser.

4. Apparatus according to claim 3, in which said low power laser is an argon or a neon laser.

5. Apparatus according to claim 1, in which the high power cutting laser is a pulse emitting carbonic acid gas laser or a carbonic acid gas, neon and helium laser.

6. Apparatus according to claim 1, in which said power laser comprises two laser tubes operating in coincidence arrangement, a total reflexion mirror being placed at one end of one of the two tubes.

7. Apparatus according to claim 2, in which said photoelectric cell is connected to a relay controlling said power laser when or after the luminous beam of the detector unit has been interrupted by the loops of one row of loops.

8. Apparatus according to claim 7 in which the carrier surface of said support is formed by a member the contour of which forms a peak, so that only the loops of one row destined to be cut successively travel across the path of the high power laser beam.

9. Apparatus according to claim 8, in which the high power laser beam is rendered divergent by means of an anamorphotic, the divergent beam being subdivided by means of a mask into several beams imping each on one leg portion of at least one loop.

10. Apparatus according to claim 8, in which said carrier surface of the support is a drum of small diameter.

11. Apparatus according to claim 8, in which said carrier surface is a wedge over which said support is caused to travel.

12. Apparatus according to claim 7 in which said relay controls the emission of the power laser by the intermediary of a pulse generator.

13. Apparatus according to claim 12, in which said high power laser is supplied on the one hand from a preionization source and on the other hand by voltage pulses from previously charged capacitors, the pulse generator being arranged to periodically control the charging of the capacitors and their discharge across the laser as a function of the signal furnished by the relay which is connected to the photoelectric cell.

* * * * *